(No Model.)
P. MILLER & J. E. LAMBETH.
BICYCLE DUST GUARD ATTACHMENT.
No. 515,007. Patented Feb. 20, 1894.
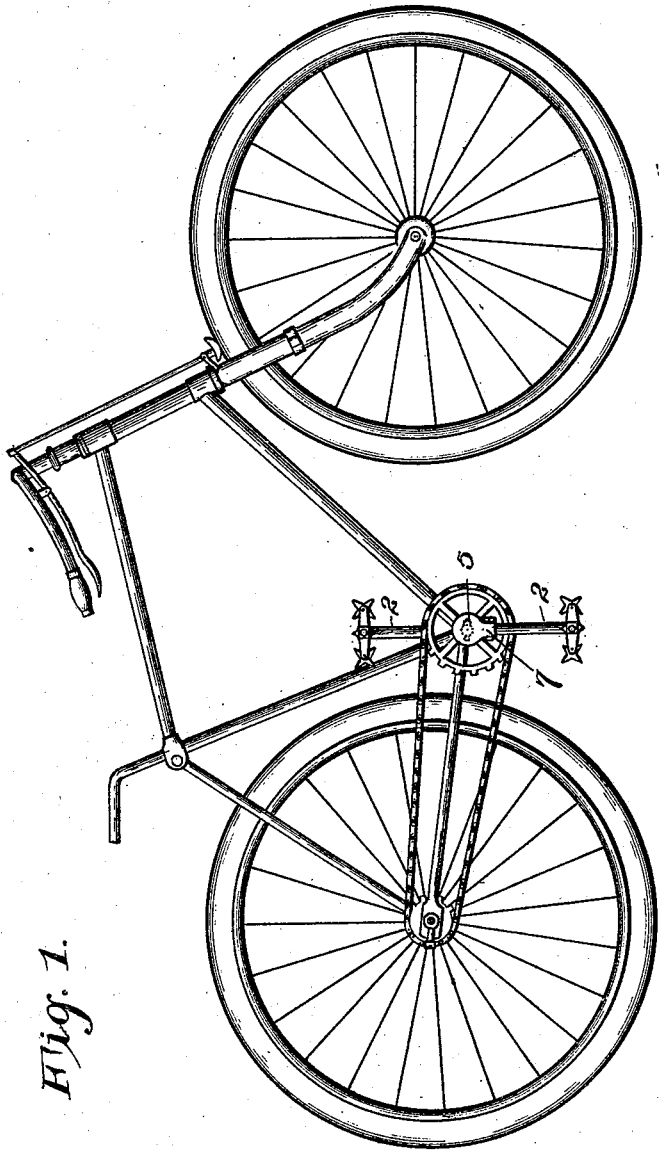
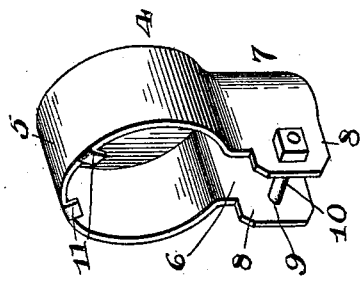
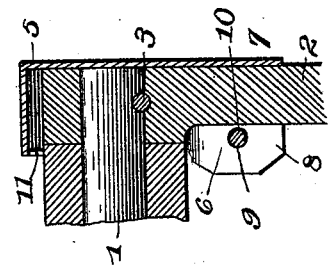

UNITED STATES PATENT OFFICE.

PHILLIP MILLER AND JOHN EDWARD LAMBETH, OF GAINESVILLE, FLORIDA.

BICYCLE DUST-GUARD ATTACHMENT.

SPECIFICATION forming part of Letters Patent No. 515,007, dated February 20, 1894.

Application filed June 21, 1893. Serial No. 478,348. (No model.)

*To all whom it may concern:*

Be it known that we, PHILLIP MILLER and JOHN EDWARD LAMBETH, citizens of the United States, residing at Gainesville, in the county of Alachua and State of Florida, have invented a new and useful Bicycle Dust-Guard Attachment, of which the following is a specification.

Our invention relates to an attachment consisting in a protecting cap designed to be employed in connection with bicycles and other rotary pedal machines.

The object of the invention is to provide an adjustable protector whereby the set-screws by which the pedal crank is attached to the pedal-shaft may be covered to prevent the engagement of the clothing of the rider therewith.

Further objects and advantages of our invention will appear in the description and the novel features thereof will be particularly pointed out in the claim.

In the drawings: Figure 1 is a view of a bicycle with the attachment embodying our invention applied thereto in the operative position. Fig. 2 is a sectional view of the device showing a part of a pedal crank and the manner of arranging the attachment in connection therewith. Fig. 3 is a detail view in perspective of the attachment.

Similar numerals of reference indicate corresponding parts in all the figures of the drawings.

In the construction illustrated, 1 designates the pedal shaft, 2 a pedal crank attached thereto, and 3 a retaining bolt by which the crank is secured to the shaft.

4 represents the attachment, which comprises a cap 5, which is larger in diameter than the eye of the crank, with the projection of the retaining bolt added thereto, one side of said cap being open, as shown at 6, to receive the pedal crank. Connected to the said open side of the cap is a, preferably, integral clamp 7, to embrace the crank, such clamp being provided upon its rear side with parallel ears 8, which are perforated, as shown at 9, to receive the adjusting-screw 10. Integral with the upper side of the cap, or that side thereof which is opposite to the opening 6, are the spacing studs or projections 11.

To apply the attachment to a machine, the adjusting-screw is removed from the clamp and the latter is slipped over the pedal crank and then inwardly or toward the shaft until the cap passes over the eye of the crank and the retaining bolt, by which the crank is secured to the shaft. After the spacing studs or projections have passed in rear of the retaining bolt the attachment is drawn downwardly or away from the shaft to cause the extremities of such studs or projections to bear against the surface of the eye of the crank, in which position the adjusting-screw is inserted and tightened to hold the device permanently in place.

It will be observed that the cap forms a smooth surface at the fulcrum of the crank, and hence affords no projection to engage the clothing of the rider; and furthermore, the clothing is prevented from coming in contact with the shaft and hence becoming soiled by the lubricating oil.

The attachment may be made of any preferred material such as wood, wire network, paper, fibrous material such as cotton or wool, rubber, leather, glass or composition, and we do not desire to limit ourselves as to the particular shape, as it may be varied to suit the style and construction of the machine, as well as the taste of the manufacturer. Furthermore, the attachment may be finished in japan, nickel, or otherwise.

Having described the invention, what we claim is—

As an improved article of manufacture, a protector for use in connection with the cranks of bicycles and other machines, comprising a cylindrical cap, 5, adapted to receive the eye of the crank and provided at one side with an opening to fit around the crank, spacing studs, 11, projecting inwardly from the edge of the cap to bear against the surface of the eye, and an integral clamp registering with the opening in the cap and having parallel perforated ears, 8, connected by an adjusting screw 10, whereby the protector may be locked securely to the crank, substantially as specified.

In testimony that we claim the foregoing as our own we have hereto affixed our signatures in the presence of two witnesses.

PHILLIP MILLER.
JOHN EDWARD LAMBETH.

Witnesses:
W. S. McDOWALL,
E. J. SHIPMAN.